July 2, 1963 L. D. LONG 3,095,629
APPARATUS FOR MAKING PRE-CAST CORED BUILDING BLOCKS
Filed Nov. 17, 1959 7 Sheets-Sheet 1

INVENTOR.
LEONARD D. LONG,
BY
Schley, Tracker Julians
ATTORNEYS.

July 2, 1963
L. D. LONG
3,095,629
APPARATUS FOR MAKING PRE-CAST CORED BUILDING BLOCKS
Filed Nov. 17, 1959
7 Sheets-Sheet 2
Fig. 4.
Fig. 2.
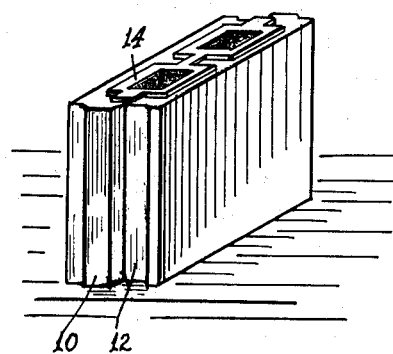
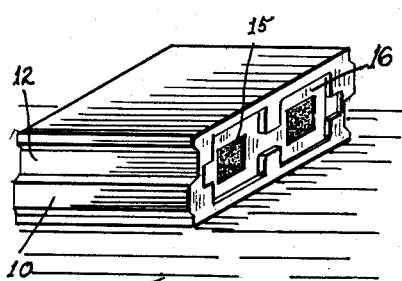
Fig. 5.
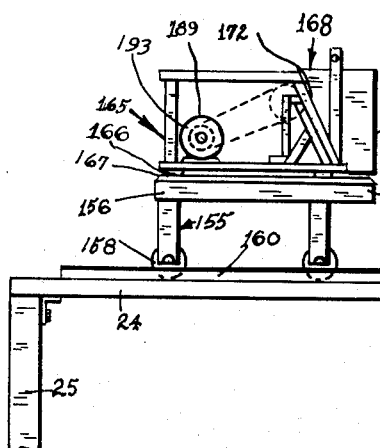
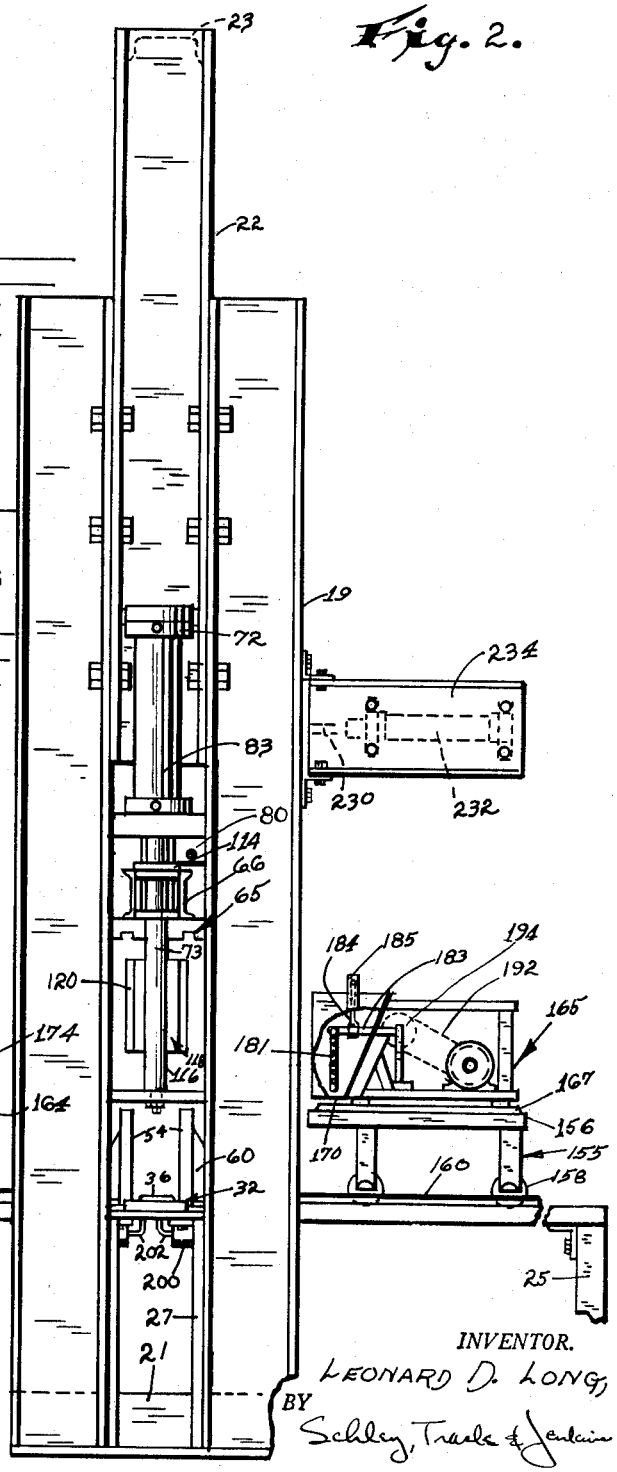
INVENTOR.
LEONARD D. LONG,
BY
Schley, Trask & Jenkins
ATTORNEYS.

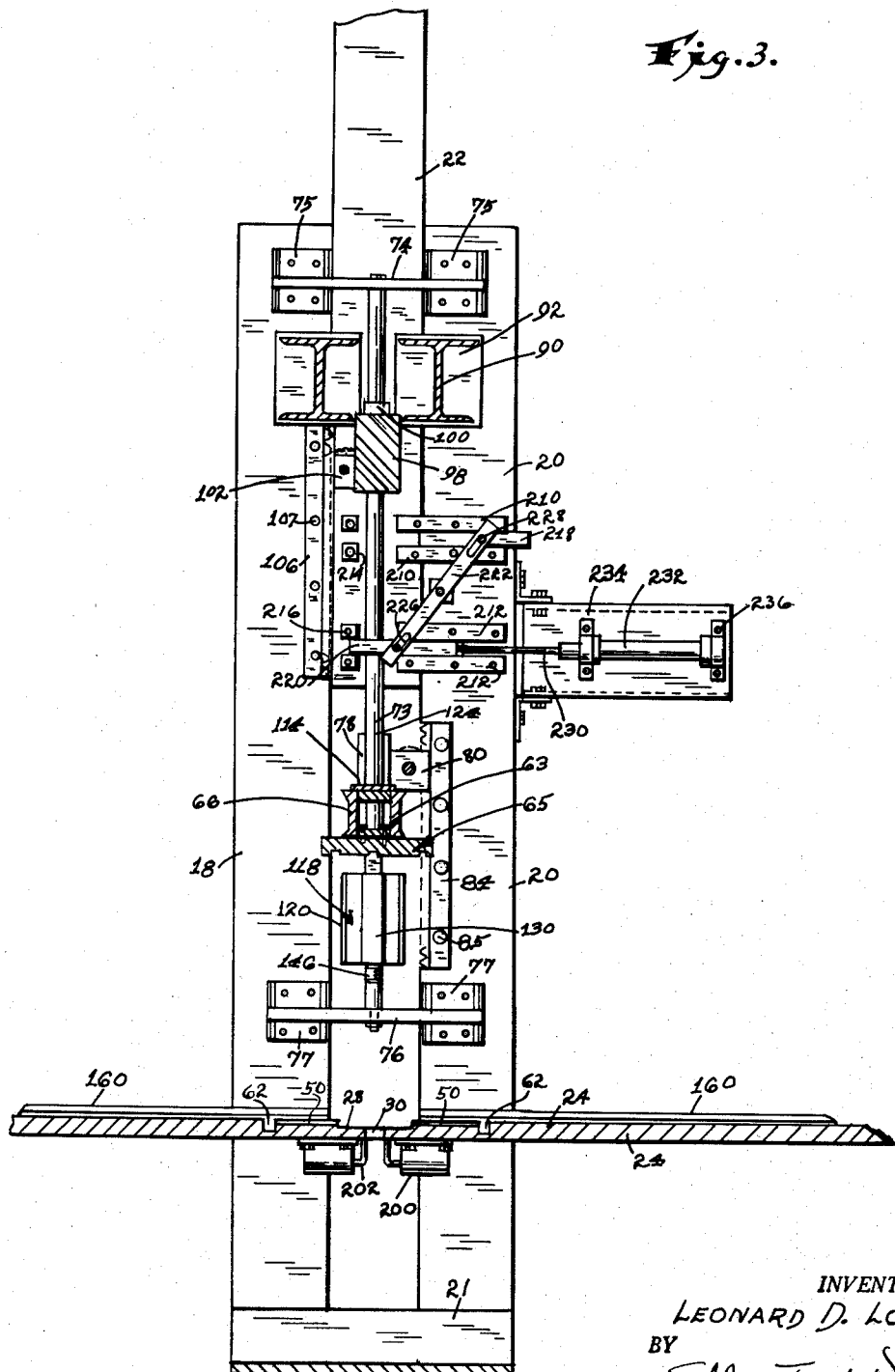

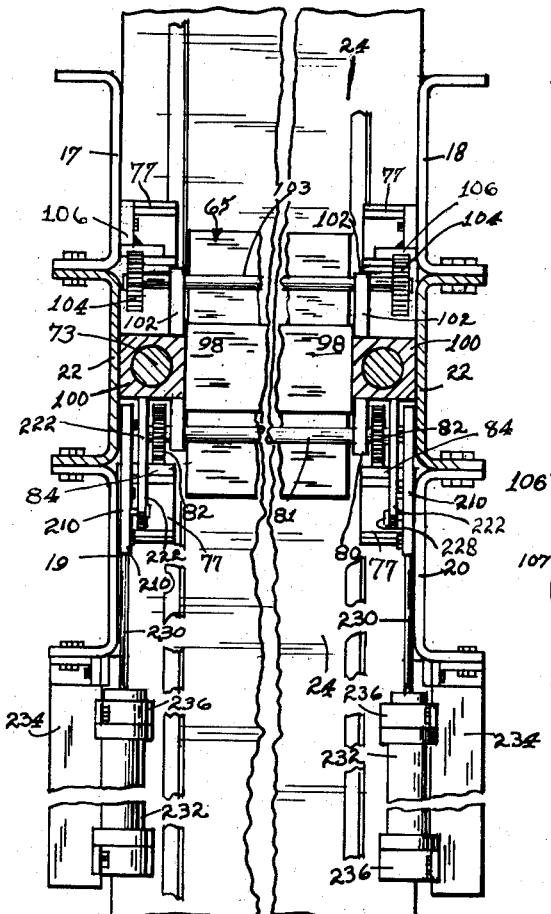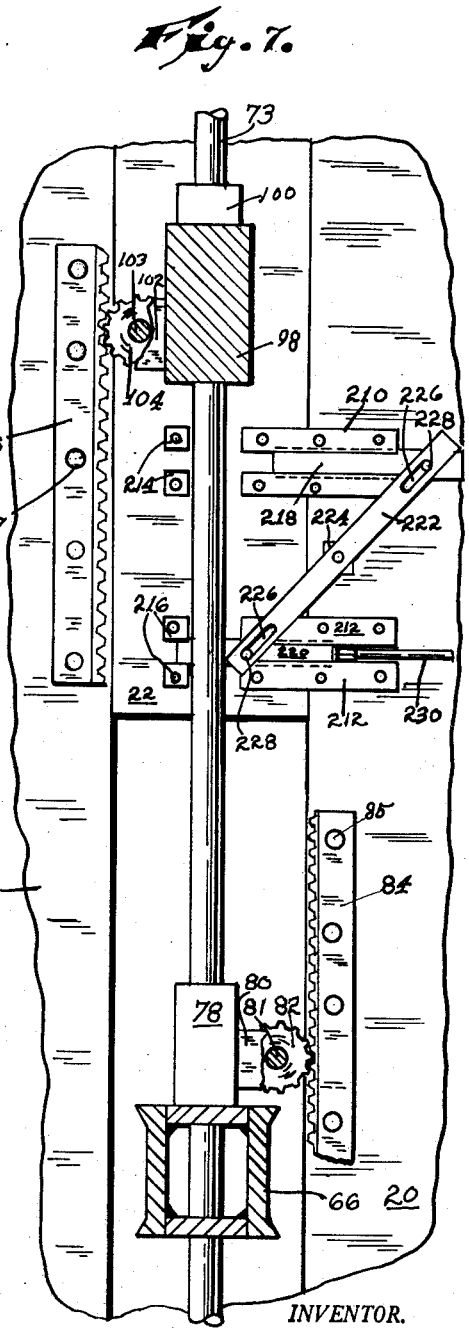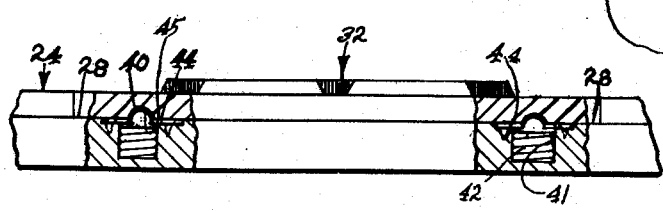

July 2, 1963 L. D. LONG 3,095,629
APPARATUS FOR MAKING PRE-CAST CORED BUILDING BLOCKS
Filed Nov. 17, 1959 7 Sheets-Sheet 5

INVENTOR.
LEONARD D. LONG,
BY
Schley, Track & Jenkins
ATTORNEYS.

INVENTOR.
LEONARD D. LONG,
BY
Schley, Track & Jenkins
ATTORNEYS.

July 2, 1963 L. D. LONG 3,095,629
APPARATUS FOR MAKING PRE-CAST CORED BUILDING BLOCKS
Filed Nov. 17, 1959 7 Sheets-Sheet 7
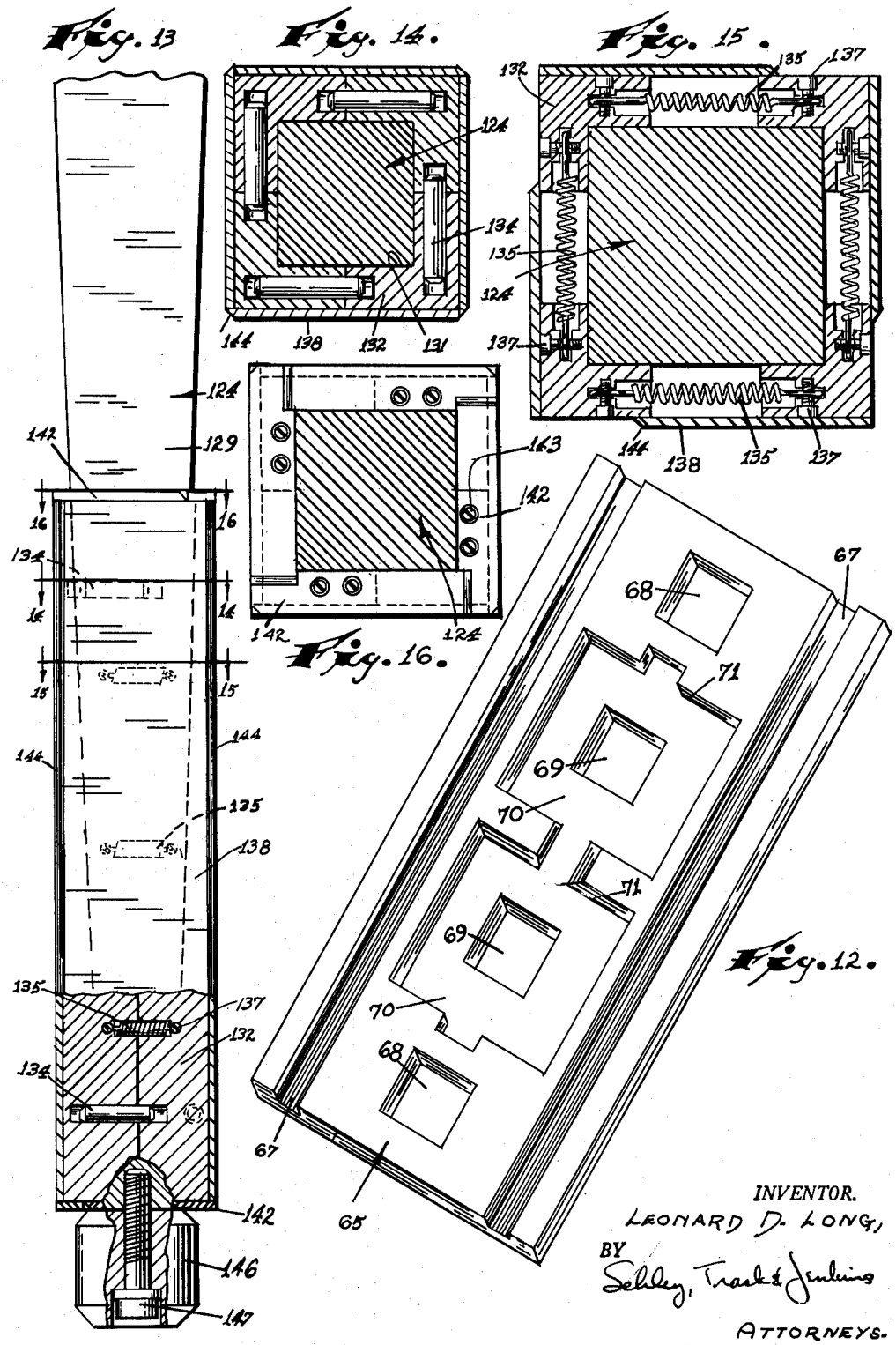
INVENTOR.
LEONARD D. LONG,
BY
ATTORNEYS.

United States Patent Office

3,095,629
Patented July 2, 1963

3,095,629
APPARATUS FOR MAKING PRE-CAST CORED BUILDING BLOCKS
Leonard D. Long, % Long Construction Co., P.O. Box 288, 2110 Mount Pleasant St., Charleston, S.C.
Filed Nov. 17, 1959, Ser. No. 853,475
5 Claims. (Cl. 25—45)

This invention relates to an apparatus for producing pre-cast cored building blocks, and more particularly to an apparatus for producing cementitious pre-cast building blocks of the type generally referred to as concrete or cinder blocks.

In producing concrete blocks, it has heretofore been the practice to employ machines having molds with fixed side walls and fixed dimensional core-forming elements. In such machines, the mold components forming the outer faces of the finished block, except for the component forming the top face of the block, and the core-forming elements are disposed in operative position; the mold is filled with aggregate; and the mold component forming the top face of the block is then placed in position. The concrete is then allowed to set up into a self-supporting condition and the partially cured block is then withdrawn from the mold. Blocks formed in molds of this type generally have a relatively low density due to the entrained air in the aggregate forming the block, and generally have relatively wide variataions in their external dimensions. In an effort to increase the density of such blocks, it has been proposed to form such blocks in a mold having sidewalls which are movable to compress the aggregate within the mold before it has set up. An apparatus and method for carrying out this type of operation are described in my Patent No. 2,624,928, issued January 13, 1953. However, in producing pre-cast blocks in such an apparatus it is difficult to produce blocks having precise, fixed, outer dimensions. This lack of uniformity in the outer dimensions of the blocks produces a corresponding lack of uniformity in walls formed from such blocks. Adjusting the amount of mortar between the ends of adjacent blocks tends to overcome the deficiences in the nonuniformity of the lengths of such blocks, but where no mortar is used between the ends of adjacent blocks, their lack of uniformity will consequently produce walls of nonuniform length. Nor will the use of mortar compensate for the differences in the widths of the blocks. Further, this lack of outer dimensional uniformity of the blocks increases the difficulty in keying the blocks together as they are laid up.

While I am aware that it has been proposed in the production of field tile and other such articles having cores formed therein to employ expandable and collapsible core-forming elements, such core-forming elements are generally adapted to be expanded only within fixed limits. That is, such elements are merely adapted to form a hollow core in the article being produced, and after forming such cores are retracted or collapsed to permit their withdrawal from the formed element. They are not adapted to expand to form the compression forces necessary to compress a mass of aggregate into a high density, pre-cast element substantially void of any network of entrained air cells. Nor are they adapted to produce an article having a high degree of uniformity in its outer dimensions.

It is an object of my invention to provide an apparatus for making pre-cast building blocks which will be adapted to produce such blocks over a wide range of sizes, which will produce such blocks having the desired patterns and contours formed in their outer faces, which will produce relatively high density blocks, and which will produce blocks having a high degree of uniformity in their outer dimensions within the size range of blocks being produced.

It is a further object of my invention to provide an apparatus for producing pre-cast building blocks in quantity and whose operational sequence for producing such blocks will require a minimum of time.

In carrying out my invention in its preferred form, I provide an apparatus comprising a frame adapted to support a worktable thereon. Disposed on said worktable is a mold for forming pre-cast building blocks and including a bottom palette adapted to be retained on the worktable in a fixed position during the molding cycle. A pair of sidewall-forming members are mounted on opposed sides of the bottom palette. The top of the mold is formed by a top palette movable from a retracted position disposed well above the mold to an operative position in which it is interlockingly received on the upper ends of the sidewall-forming members. Conveniently, the top and bottom palettes may be provided with corresponding keys and keyways for forming tongue and groove patterns on the upper and lower faces of the blocks being produced. The ends of the mold are closed by a pair of end-formers carried on shafts supported by a vertically movable beam disposed above the top palette and extending transversely of the supporting frame. Said end-formers are adapted to be moved from a retracted position disposed well above the mold to an operative position in which they rest on the bottom palette between the sidewall-forming members. The beam carrying the shafts for the end-formers also carries a plurality of shafts having expandable core-formers carried thereon. Thus, movement of said beam will move the end-formers and core-formers between a retracted position well above the mold and an operative position in which they are seated on the bottom palette between the opposed sidewall-forming members. Continued lowering of the beam after the core and end-formers are seated on the bottom palette causes the core-formers to expand to increase their lateral extent and thus compress the aggregate disposed within the mold.

The aggregate used in forming the blocks is carried in a pair of hoppers supported on the worktable on either side of the mold. The hoppers are movable on the worktable toward each other to an operative position in which they overlie the mold cavity for discharging the aggregate into said cavity.

Other embodiments and features of my invention will become more apparent from the detailed description which follows and from the accompanying drawings, in which:

FIG. 2 is a side elevation of the apparatus shown in FIG. 1;

FIG. 3 is a vertical section taken on the line 3—3 of FIG. 1, but with portions of the mold being removed;

FIG. 4 is an isometric view of a block produced in the apparatus shown in FIG. 1;

FIG. 5 is an isometric view similar to FIG. 4, but showing the block lying on one of its sides;

FIG. 6 is a fragmentary horizontal section taken on line 6—6 of FIG. 1;

FIG. 7 is a vertical section showing the end and core-former beam locking mechanism;

FIG. 11 is a fragmentary side view of the bottom palette and worktable with portions thereof broken away to show the palette locator pins;

FIG. 12 is an isometric view of the top palette;

FIG. 13 is a side elevation of a core-former with portions thereof broken away,

FIG. 14 is a horizontal section taken on the line 14—14 of FIG. 13;

FIG. 15 is a horizontal section taken on the line 15—15 of FIG. 13, but showing the core-former in extended position;

FIG. 16 is a horizontal section taken on the line 16—16 of FIG. 13.

Figure 1:
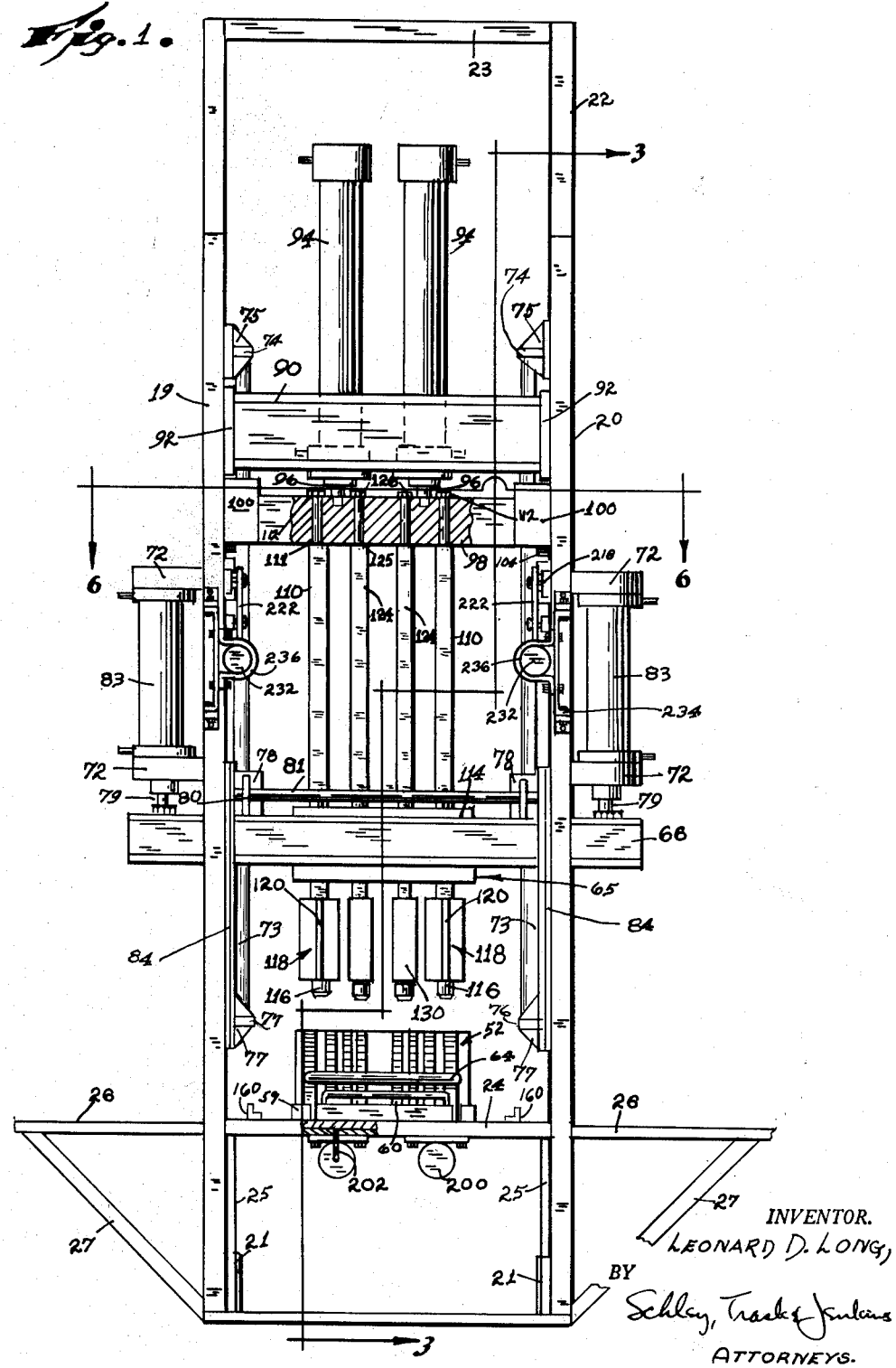
FIG. 1 is an end elevation of an apparatus embodying my invention for making pre-cast, cored blocks, but with the aggregate buckets removed therefrom.

My invention is adapted to produce pre-cast concrete blocks having a high density and an extremely high degree of external dimensional uniformity. For example, concrete blocks produced in my apparatus have tolerances of less than 1/64 of an inch on blocks of eight-foot lengths. By making blocks with such a high dimensional uniformity, I am able to lay up walls with precise lengths and thicknesses. I am further able to lay up such walls without the use of mortar between the adjacent ends of adjacent blocks, and may employ keys and keyways on the outer block faces so that the blocks are laid up in an interlocking relationship.

The small tolerances in the outer dimensions of my blocks make it possible to lay up a wall of such blocks about four or five feet high without the use of mortar, the mating keys and keyways in adjacent blocks locking them together. In laying the blocks, the cores will be disposed in vertical alignment so that concrete may be poured down the columns formed by the aligned cores of the blocks to hold the blocks in fixed position and form a truly rigid structure.

As shown in FIGS. 4 and 5, such a block may be provided with a vertically extending key 10 and keyway 12 at each of its ends, and with mating keys 14 and keyways 16 on its top and bottom faces bordering the spaced cores 15 extending through the block. Further, the blocks produced in my apparatus have an extremely high density with substantially no internally entrained air cells. This permits an extremely strong block to be produced. It permits the production of blocks having a height at least twelve inches, as compared to the conventional eight-inch height of blocks formed in machines previously available.

As illustrated, my apparatus for producing such blocks comprises a supporting frame conveniently formed from spaced, vertically extending frame elements 17, 18, 19, and 20 in the form of channeled beams and arranged in opposed pairs with their smooth faces presented inwardly. The lower ends of the frame elements are interconnected and cross-braced by steel braces 21. Toward their upper ends, each pair of the frame elements is rigidly connected to a third vertically extending frame member 22 interposed between the frame elements in each pair and extending thereabove. The upper ends of the frame members 22 are rigidly connected to a brace 23 extending transversely of the apparatus.

Figure 8:
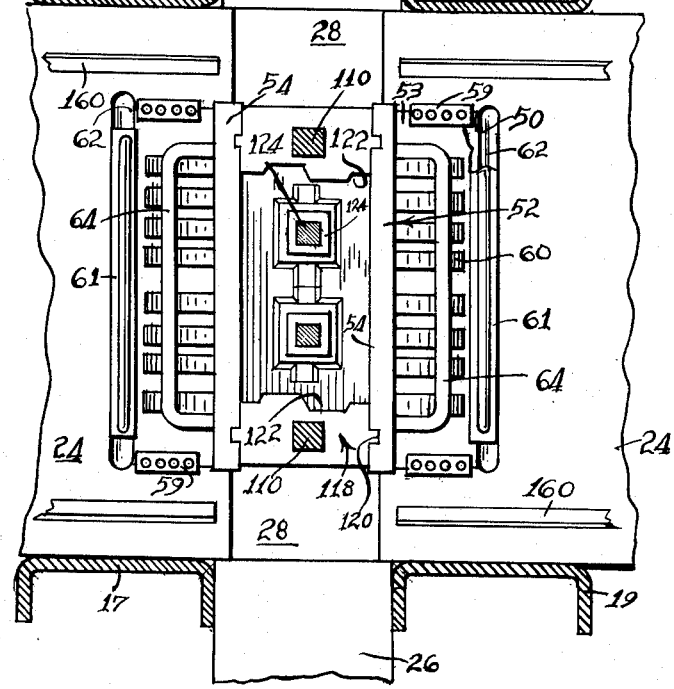
FIG. 8 is a top plan view of the mold-cavity.

A horizontally disposed worktable 24 is mounted on the frame elements 17–20, and extends longitudinally outwardly therefrom, the ends of said worktable being supported on suitable floor-engaging legs 25. Extending outwardly from the opposed sides of the worktable and between the pairs of opposed frame elements are shelves 26 supported at their outer ends by braces 27 connected to the frame elements. As illustrated in FIG. 8, the worktable 24 is provided with a groove 28 extending transversely of the table between the opposed pairs of upright support members and coplanar with the upper faces of the shelves 26.

A bottom palette 32 is slidable in the groove 28 and has a plurality of openings 34 and 35 adapted to be disposed in alignment with a corresponding set of openings 30 formed in the groove 28 and extending through the worktable 24. Conveniently, in order to produce the keyways 16 in the bottom faces of the blocks, the openings 34 in the bottom palette 32 are bordered by projections 36 having beveled edges 37, and apertures 39 aligned with the palette openings 34. Conveniently, the palette 32 is further provided with openings 38 adjacent its ends for the reception of hooks or other elements for sliding the palette along the worktable groove 28. Alternatively, the palette 32 may be slid into and out of operative position by any suitable power means mounted on the worktable 24 or on one of the shelves 26.

Desirably, in order to locate the bottom palette in operative position on the worktable 24 a plurality of locator pins are disposed in the upper face of the groove 28. As shown in FIG. 11, each of the locator pins comprises a button 40 received in a shouldered opening 41 formed in the worktable 24 and spring biased above the plane of the worktable groove 28 by a coil spring 42. The button 40 and the spring 42 are held in the opening 41 by an annular collar 44 mounted in the shouldered upper end of the opening 41 and extending inwardly from the edges thereof to engage the marginal flange on the button 40 to hold it in the opening 41. Recesses 45 are formed in the lower face of the bottom palette 32 in which the upwardly projecting buttons 40 may seat to locate the palette in an operative position as it is slid along the groove 28.

Figure 10:
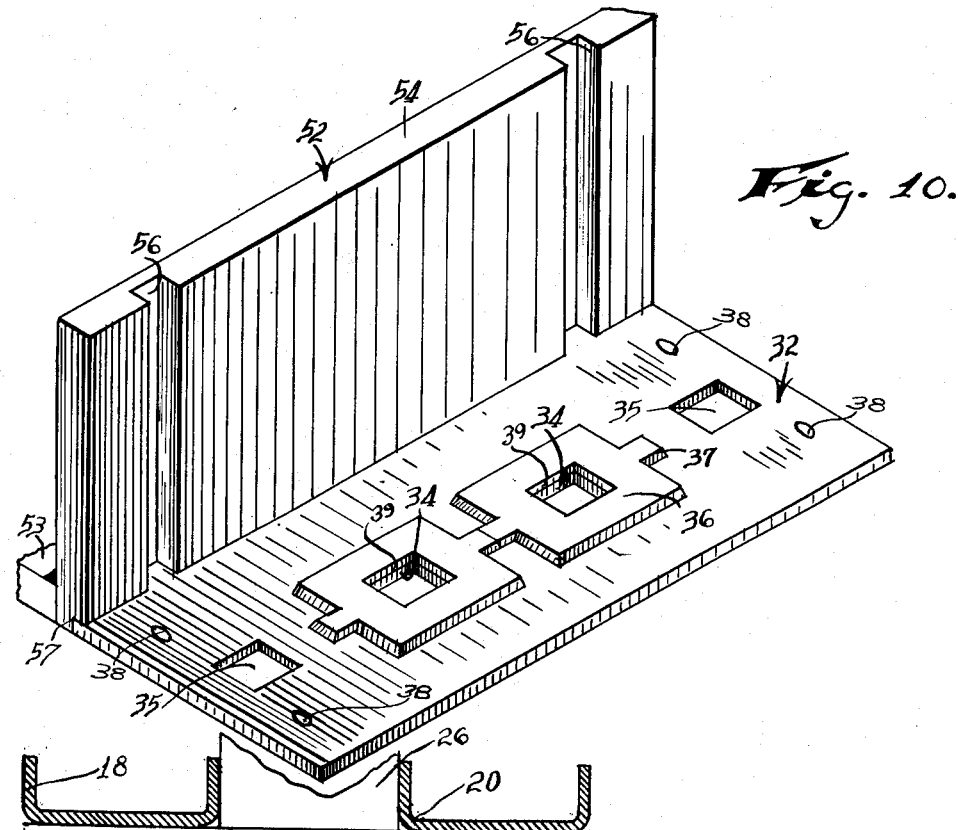
FIG. 10 is an isometric view of the bottom palette and one of the sidewall-forming members.

The worktable 24 is further provided with a longitudinally extending groove 50 intersecting the groove 28 at its mid-portion. Slidable in the table groove 50 are a pair of mold sidewall-forming members 52, each of which comprises a base 53 and wall 54 extending upwardly from the inner edge of the base. The base and wall are connected, as by welding along their abutting edges, and by a plurality of triangularly shaped braces 60 welded to the adjacent faces of the base and wall. As shown in FIG. 10, the inner face of the wall 54 has a vertically extending keyway 56 adjacent each of its ends. Each of the walls 54 is recessed, as at 57, along its lower edge so that when the bases 53 of the sidewall-forming members are slid inwardly in the groove 50, the recesses 57 in the walls 54 will be received over the lateral edges of the bottom palette 32. To guide the sliding movements of the sidewall-forming members 52 in the groove 50, and to hold said members in the groove, I provide pairs of guide blocks 59 removably mounted on the table 24 adjacent the edges of the groove 50 and extending over the lateral edges of the bases 53. The sidewall-forming members 52 are releasably held in operative position on the bottom palette by keys 61 extending over the rear edges of the bases 53 and receivable in transversely extending keyways 62 formed in the worktable 24. Conveniently, handles 64 may be mounted on the members 52 to facilitate handling said members and sliding them along the table groove 50.

The top of the mold is closed by a top palette 65 mounted on the lower face of a transversely extending beam 66 as by bolts 63 extending downwardly through the beam 66. As shown in FIG. 12, the top palette 65 is provided with a pair of longitudinally extending grooves 67 adapted to fit over the upper ends of the mold sidewalls 54, and a plurality of centrally disposed openings 68 and 69 corresponding to the openings 35 and 34 in the bottom palette 32. Conveniently, in order to produce the keys 14 in the top faces of the blocks, the openings 69 are bordered by recesses 70 having beveled edges 71, and corresponding to the projections 36 on the bottom palette.

The beam 66 upon which the top palette is mounted extends transversely of the worktable 24 with its ends projecting outwardly from between the pairs of the frame members 17 and 19, and 18 and 20. The ends of the beam 66 are connected to the rams 79 of a pair of hydraulic cylinders 83 mounted on either side of the supporting frame as by brackets 72. The cylinders 83 are adapted to move the beam 66 and the palette 65 vertically with respect to the worktable 24 to move said palette between an operative position in which it is received over the upper ends of the sidewalls 54, and a retracted position in which it is disposed well above said sidewalls. As shown in FIG. 3, such vertical movement of the beam 66 and the top palette 65 is guided by a pair of vertically extending guide rods 73 disposed on either side of the apparatus on the transverse axis thereof. The upper ends of the guide rods 73 are mounted on the supporting frame by bars 74 rigidly secured to brackets 75 mounted on the inner faces of the frame elements at each side of the machine. Similarly, the lower ends of the guide rods 73 are carried by bars 76 secured to mounting brackets 77 mounted on the inner faces of the frame elements. Thus, the guide rods 73 are disposed slightly inwardly from and between the pairs of frame elements 17 and 19, and 18 and 20 on the transverse axis of the apparatus. A guide block 78 is mounted on the beam 66 adjacent each end thereof, and is slidably received on one of the guide rods 73 to guide the vertical movements of the beam 66 upon said guide rods 73.

To further insure guided vertical movement of the beam 66 for keeping said beam horizontally aligned during its vertical movements, I mount a pair of blocks 80 on said beam adjacent the opposite ends thereof. Journaled within the blocks 80 is an axle 81 carrying a pair of gears 82 which project outwardly beyond the edges of the blocks 80 to mesh with vertically extending gear racks 84 mounted on the inner faces of the frame elements 19 and 20 as by bolts 85. Thus, as the beam 66 is moved vertically by the cylinders 83 the gears 82 and their cooperating gear racks 84 act in combination with the guide blocks 78 and the guide rods 73 to keep the ends of said beam in horizontal alignment.

Adjacent their upper ends the opposed pairs of frame elements 17 and 19, and 18 and 20 are interconnected by a pair of transversely extending beams 90 secured to the inner faces of the opposed frame elements by plates 92. The beams 90 support a pair of cylinders 94 having downwardly extending, vertically movable rams 96. The lower ends of the rams 96 are connected to a transversely extending beam 98 supported above the palette beam 66 and vertically movable with respect to the worktable 24 A guide block 100 is mounted on each end of the beam 98 and is slidable on the guide rods 73 for guiding the vertical movement of the beam 98 upon actuation of the cylinders 94. To add further horizontal stability to the beam 98, a pair of blocks 102 are mounted at each end thereof and carry an axle 103 provided with a pair of gears 104. The gears 104 project outwardly from the blocks 102 to mesh with vertically extending gear racks 106 mounted on the inner faces of the frame elements 17 and 18 as by bolts 107. Thus, as the beam 98 is moved vertically by the cylinders 94 the gears 104 and their corresponding gear racks 106 act in combination with the guide blocks 100 and guide rods 73 to keep the beam 98 horizontally aligned.

Extending downwardly from the beam 98 is a pair of shafts 110 having uniform cross-sections throughout their lengths. Adjacent their upper ends the shafts 110 are shouldered, as at 111, to abut the lower face of the beam 98, with their upper ends projecting above said beam for the reception of nuts 112 for rigidly connecting the shafts to the beam. The shafts 110 extend downwardly from the beam 98 through openings formed in a horizontally disposed guide plate 114 mounted on the upper face of the palette beam 66, through openings formed in said palette beam, and finally through the openings 68 in the top palette 65.

Slidably carried on the shafts 110 below the top palette are a pair of end-formers 118 adapted to close the ends of the mold cavity. The shafts 110 are slidable in centrally disposed, vertically extending openings formed in the end-formers and are thus vertically movable with respect to said end-formers. The end-formers are supported on the shafts for vertical movement therewith by pilots 116 secured to the lower ends of the shafts and engageable bottom faces of the end-formers, the end-formers being held in engagement with the pilots by gravity. As shown in FIG. 8, the lateral faces of the end-formers 118 are provided with ribs 120 projecting outwardly therefrom for reception in the keyways 56 formed in the sidewalls 54 to guide the vertical movement of the end-formers as they are lowered into operative position between the sidewall-forming members 52. During lowering of the shafts 110, the pilots 116 project through the openings 35 in the bottom palette 32 to permit the lower faces of the end-formers 118 to seat upon the upper face of said palette. The opposed inner faces of the end-formers 118 are keyed, as at 122, to form the keys 12 and keyways 14 in the finished block.

A second pair of shafts 124 are also carried by the beam 98 between the shafts 110. As shown, the shafts 124 are shouldered, as at 125, to abut the lower face of the beam 98 with their upper ends projecting above the upper face of the beam 98 for the reception of nuts 126 to connect the shafts to the beam. The shafts 124 also extend through openings formed in the guide plate 114, through openings in the palette beam 66, and finally through the openings 69 in the top palette 65. The lower ends of the shafts 124 support expandable core-formers 130 slidably carried thereon below the top palette 65 and adapted to seat on the bottom palette 32 upon lowering of the beam 98.

As illustrated in FIGS. 13–16, the lower end of each of the shafts 124 has tapering thrust faces 129 which abut the correspondingly tapered inner thrust-receiving faces 131 of four elongated L-shaped core segments 132. The L-shaped cross-section of the core segments provides each such core segment with a pair of thrust-receiving faces 131 engageable with a pair of the thrust faces 129 on the shaft 124. This permits the core segments to be moved uniformly laterally outwardly along the oblique axes of the shafts during expansion of the core-formers. Each pair of adjacent core segments is interconnected by a plurality of horizontally disposed, vertically spaced guide rods 134 secured to one of the core segments in each pair and slidable in aligned openings formed in the other core segment of each pair for keeping the core segments in horizontal alignment during expansion and contraction. The core segments are held in assembled relation and urged into a contracted or collapsed position by a plurality of horizontally disposed, vertically spaced coil springs 135. The springs are carried in recessed aligned openings formed in the adjacent faces of adjacent core segments, with the ends of each of said springs secured to the core segments by screws 137 countersunk in the outer faces of said core segments.

Each of the core segments is also provided with a face plate 138 secured to one of its vertically extending outer faces and slidable against the outer face of an adjacent core segment. Thus, the face plates 138 will bridge the spaces between adjacent core segments when the core-former is in extended position to prevent the entry of aggregate into the core-former. Similarly, the top and bottom faces of the core-formers are enclosed by cover plates 142, each of which is secured to one of the core segments 132 as by screws 143. Each of the cover plates 142 is slidable on the end face of a core segment adjacent to the core segment to which it is secured and bridges the space between a pair of adjacent core segments to prevent the entry of aggregate into the core-former when it is in extended position. Conveniently, the plates 138 and 142 have beveled edges 144 to screed the faces of the core segments upon which they slide during contraction of the core-former.

The core-formers are retained on the ends of the shafts 124 by pilots 146 secured to the end faces of the shafts by bolts 147. The pilots have a sufficient lateral extent such that their upper faces will engage the lower faces of the bottom cover plates 142 when the core-formers are in collapsed position to support said core-formers on the shafts 124.

In operation, the shafts 124, and thus the core-formers, are lowered by the beam 98 with the shaft pilots 146 projecting through the openings 34 in the bottom palette 32 and the openings 30 in the worktable 24. Continued lowering of the shafts 124 causes their tapered thrust faces 129 to bear against the inner thrust-receiving faces 131 of the core segments to move said core segments laterally outwardly in spaced relation to each other as shown in FIG. 15. This horizontal movement of the core segments 132 is guided by the guide pins 134 sliding in the aligned openings formed in the adjacent pairs of core segments. During such lateral movement, the core segments 132 will slide along the face plates 138 and cover plates 142 with said plates bridging the spaces between the adjacent core segments to prevent the entry of aggregate into the expanded core-formers. Collapse of the core-formers is effected by moving the shafts 124 upwardly. As the shafts are moved upwardly, the core segments 132 are moved into collapsed abutting relationship under the action of the springs 135. During this collapsing movement, the beveled edges 144 on the face and cover plates 138 and 142 screed off any aggregate that may have adhered to the outer faces of the core segments 132. Continued upward movement of the shafts 124 will permit the core segments to assume their fully collapsed position as shown in FIG. 14, and will dispose the upper faces of the pilots 146 against the lower faces of the bottom cover plates 142 to support the core segments on the shafts 124 for upward movement therewith.

Figure 9:
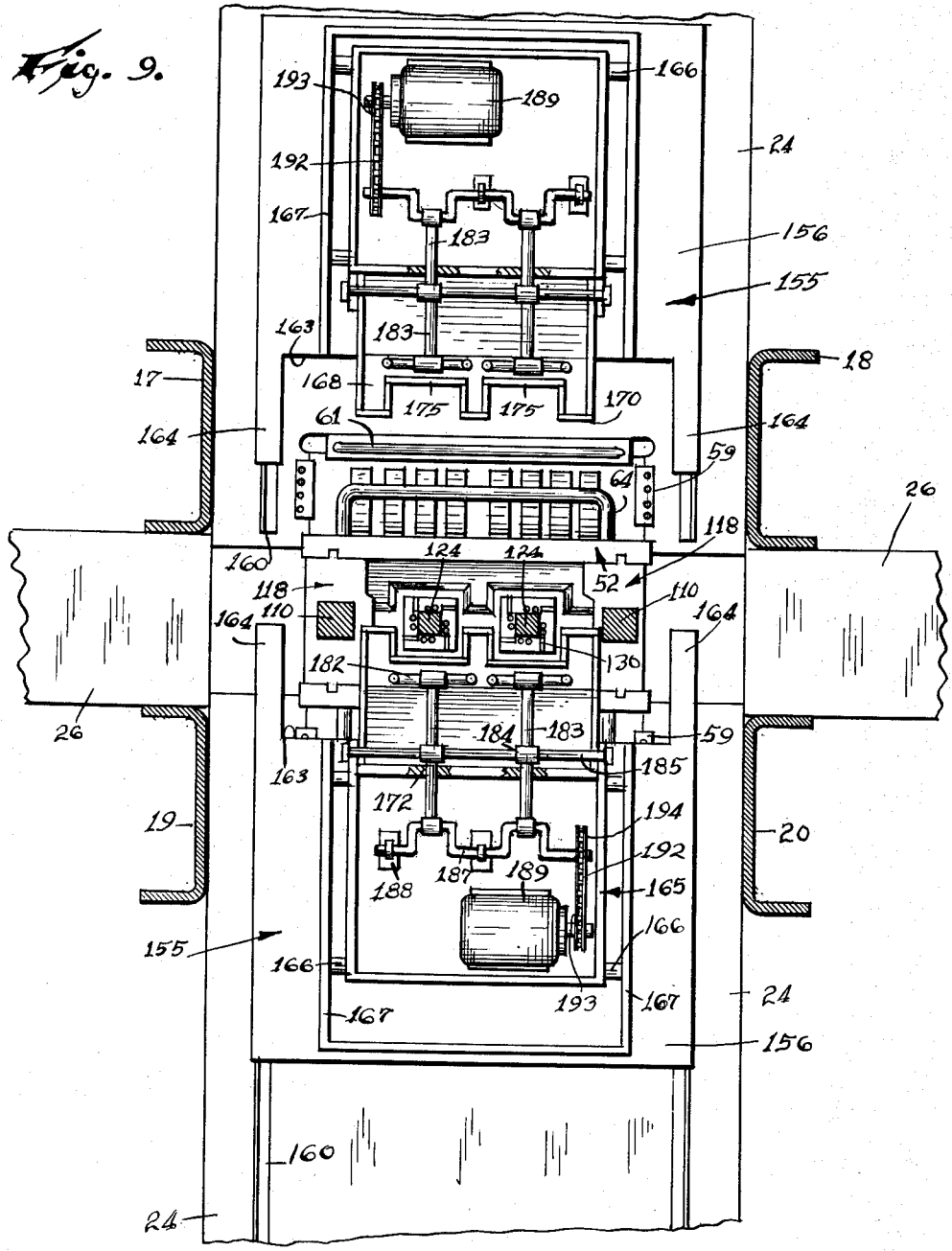
FIG. 9 is a top plan view of the mold-cavity, and showing one of the aggregate buckets in operative position and one of the aggregate buckets in a partially retracted position.

In order to introduce the aggregate into the mold, I provide a pair of hoppers 155 carried on the worktable 24 on either side of the mold-forming components. Each of the hoppers 155 is identical in construction and operation, and comprises a base 156 mounted on rollers 158 for moving the hopper toward and away from the mold-forming components on tracks 160 conveniently formed from lengths of angle iron mounted on the worktable 24. The base 156 has a floor parallel to the worktable 24 and having a lateral extent slightly greater than the length of the sidewall-forming members 52 of the mold, but provided with a recess 163 along its forward or inner edge corresponding to the length of the sidewall-forming members 52. A pair of forwardly extending abutments 164 are disposed on either side of the recess 163 and are adapted to extend forwardly to the transverse axis of the mold when the hopper is in operative position, as shown in FIG. 9.

Movable on the base floor is a bucket carriage 165 mounted on rollers 166 adapted to ride along tracks 167 on the base floor 162. Adjacent its inner end the carriage 165 is provided with a bucket 168 having a lateral extent substantially equal to the distance between the opposed faces of the end-formers 118, and provided with an inclined rear wall 172 and an open bottom 170 slidable over the top of one of the mold members 52 upon movement of the bucket into an aggregate-dumping position. The forward face 174 of the bucket 168 is disposed in a substantially vertical plane and is provided with rectangularly shaped recesses 175 having a size and configuration corresponding to that of the collapsed core-formers 130. In order to insure a complete and rapid fill of the mold cavity, I provide a pair of tampers carried in each of the buckets 168, each of which comprises a vertically extending shaft 181 having a plurality of vertically spaced, horizontally extending fingers 182. The upper end of each of the tamper shafts is pivotally connected to one end of a lever 183 extending through a slot cut in the rear wall 172 of the bucket and pivotally supported by a yoke 184 carried in a support rod 185. The opposite ends of the levers are rotatably connected to a crankshaft 187 rotatably carried in suitable pillows 188 on the carriage 165. The crankshaft 187 is driven by a motor 189 mounted on the carriage 165 and connected to the crankshaft by a chain 192 and a pair of sprockets 193 and 194. Thus, the yokes 184 and levers 183 impart a vertical movement to the tampers so that the shafts and fingers thereon will force the aggregate out of the bucket 168 into the mold, and will cause the aggregate to be packed into the mold to a level even with the upper faces of the sidewalls.

Although the tampers on the aggregate buckets 168 produce a substantially uniform fill of the mold, the uniformity of the aggregate fill is enhanced by the provision of agitating means operable against the bottom palette 32. Such agitation may be provided by any conventional type of agitator. As shown, I employ a pair of agitators 200 having hammers 202 adapted to extend upwardly through openings in the worktable 24 for striking the lower face of the bottom palette 32 adjacent the ends thereof. The action of the agitators 200 against the bottom palette 32 serves in combination with the bucket tampers to settle the aggregate, and thereby provide a uniform fill throughout the extent of the mold. In mounting the agitators 200 on the worktable 24 it is of course necessary to position them away from the openings 30 formed in the worktable 24, so that the shafts carrying the end-formers and core-formers can project through their respective openings 30 in the worktable during expansion of the core-formers.

In order to insure maximum compression of the aggregate within the mold, it is desirable to lower the core-formers and end-formers into the mold cavity and fill said cavity with aggregate while the core-formers are still in a completely collapsed position. To this end, I provide a mechanism adapted to control the vertical movements of the beam 98 in a stepwise sequence, and thus control both the vertical and the expansion and contraction movements of the core-formers. Such a locking mechanism is illustrated in FIG. 7 and comprises pairs of upper and lower guides 210 and 212 mounted on the opposed faces of the frame members 19 and 20, and pairs of upper and lower guide blocks 214 and 216 mounted on the opposed faces of the frame members 22 in horizontal alignment with the guides 210 and 212 respectively. The adjacent edges of the pairs of guides and guide blocks define guide channels with the faces of the frame members upon which they are mounted. Slidable in the channels formed by the upper pairs of guides 210 and guide blocks 214 are upper slides 218, and slidable in the channels formed by the lower pairs of the guides 212 and guide blocks 216 are lower slides 220. The upper and lower pairs of slides are interconnected by links 222 pivotally mounted on brackets 224 secured to the frame members 19 and 20. Each of the slides 218 and 220 is provided with a pin 228 slidably received in longitudinally extending slots 226 formed in the links 222 adjacent the ends thereof to pivotally interconnect each of said links to an upper and lower slide. The slides are movable between and away from their respective guide blocks 214 and 216 by means of rams 230 connected to the lower slides 220 and actuated by a pair of hydraulic cylinders 232 mounted as by brackets 236 to a pair of frames 234 secured to the frame elements 19 and 20. Thus, as shown in FIG. 7, as the ram 230 moves the slide 220 to the left in the guides 212 it will be received between the pair of guide blocks 216, with the link 222 pivotally interconnecting the upper and lower slides causing the upper slide 218 to slide to the right in the guides 210.

The slides 218 and 220 are positioned on the inner faces of the supporting frame such that as they are moved toward their respective guide blocks 214 and 216 they will lie in the path of vertical movement of the guide blocks 100 mounted on the ends of the beam 98 carrying the end-formers and core-formers. Thus, with the lower slides 220 moved to the left, as shown in FIG. 7 the upper slides 218 will be moved to the right so that the beam 98 may be lowered until the lower faces of the guide blocks 100 rest upon the lower slides 220. In this position, the lower faces of the core-formers and end-formers are seated upon the upper face of the bottom palette 32 with the core-formers in collapsed position. With the core-formers and end-formers thus positioned, the mold may be filled with aggregate. When it is desired to expand the core-formers, the cylinders 232 are actuated to move the lower slides 220 out of the path of the guide blocks 100 to permit the beam 98 to be lowered with the tapered shafts 124 effecting an expansion of the core-formers.

Prior to the upstroke of the beam 98 to effect collapse of the core-former, the lower slides 220 are moved back toward their guide blocks 216 and thus in the path of movement of the beam guide blocks 100. This permits the beam 98 to be raised only sufficiently to collapse the core-formers. During such collapsing movement of the core-formers, the top palette 65 will be in its operative position closing the top of the mold, and thus it will also serve to hold the core-formers in the mold during their collapsing movements. With the core-formers fully collapsed, the top palette is raised, and then the core-formers and end-formers may be withdrawn from the mold by moving the lower slides 220 out of the path of movement of the guide blocks 100, permitting the beam 98 to be raised for extracting the core-formers and end-formers from the mold. After the beam 98 and guide blocks 100 have passed the plane of the slides 220, said slides are moved back toward their guide blocks 216 to move the upper slides 218 out of the path of the beam guide blocks 100 to permit the beam 98 and its guide blocks 100 to move upwardly past the slides 218. When the beam 98 is above the slides 218, the slides 218 are moved between their guide blocks 214 to lie in the path of guide blocks 100 for supporting the beam 98, and thus the core-formers and end-formers in raised position.

In producing a pre-cast cored block in the apparatus just described, the following sequence may be employed: The bottom palette 32 is slid along the worktable groove 28 until the recesses 45 in its lower face register with the locator pins 40 on the worktable to thus locate the bottom palette in operative position. The sidewall-forming members 52 are then slid inwardly in their groove 50 until the recesses 57 along the lower edge of the sidewalls 54 are received over the lateral edges of the bottom palette 32. With the sidewall-forming members thus positioned, their retainer keys 61 are placed in operative position to releasably lock the mold sidewalls 54 in operative position along the opposed edges of the bottom palette 32.

With these mold components in operative position, the core-formers 130 and end-formers 118 are lowered into the mold. This is accomplished by actuating the locking mechanism controlling the vertical movement of the beam 98 so that the slides 220 of said locking mechanism are slid into the path of movement of the guide blocks 100 at the ends of the beam 98. Actuation of the cylinders 94 will then lower the beam 98 until its guide blocks 100 rest against the upper faces of the slides 220, in which position the bottom faces of the core-formers and end-formers will be seated on the upper face of the bottom palette with the end-former pilots 116 being received in the bottom palette openings 35 and the core-former pilots 146 being received in the bottom palette openings 34. The end-formers will be further guided into and retained in their lowered operative positions by the reception of the ribs 120 in the sidewall keyways 56. During this lowering, the beam 98 is guided by its guide blocks 100 sliding on the guide rods 73, and by the gears 104 tracking along the gear racks 106.

Aggregate is then added to the mold cavity by moving the hoppers 155 toward the transverse axis of the mold along the tracks 160 until the abutments 164 on the opposed hoppers are in abutting relationship along the transverse axis of the mold. The bucket carriages 165 are then moved toward each other until the inner bucket faces 174 are received around the core-former shafts 124 to thus dispose the open bottoms 170 of the buckets over the top of the mold cavity. Actuation of the tampers by the motors 189 will thus discharge the aggregate in the buckets 168 into the mold cavity until said cavity is filled to a level at least as high as the upper edges of the sidewalls 54. As the mold cavity is being filled, the agitators 200 are also actuated to cause their hammers 202 to beat against the bottom palette 32 and thereby produce a uniform fill of aggregate in the mold cavity. Desirably, the aggregate mixture used in forming blocks in my apparatus is sufficiently plastic that it will not exit through the open bottom of the buckets 168 without actuating the tampers. After the mold cavity is filled, the bucket carriages are moved outwardly on the hopper carriages, and the hopper carriages are then moved outwardly away from the mold on their tracks 160.

With the mold thus filled with aggregate, the top palette 65 is lowered into operative position to close the top of the mold. To lower the top palette into operative position, the cylinders 83 are actuated to drive the beam 66 downwardly, said beam being guided by the guide blocks 78 sliding on the guide rods 73 and by the gears 82 tracking along the gear racks 84.

The aggregate within the mold is compressed by further lowering of the beam 98 by the cylinders 94 to expand the core-formers 130. To permit the beam 98 to be lowered to effect core-expansion, the slides 220 are withdrawn from the path of movement of the guide blocks 100 on the beam 98 by the action of the cylinders 232. This second step of lowering the beam 98 lowers the shafts 110 and 124 with their lower ends projecting through the openings in the bottom palette and worktable. During such beam movement, the straight sided shafts 110 will slide on through the end-formers without changing their dimensions. However, the tapered lower ends of the shafts 124 will, in sliding through the core-formers 130, cause said core-formers to expand laterally outwardly in the manner previously described. Upon such lateral expansion of the core-formers, the aggregate is compressed within the mold against the inner faces of the end-formers 118, the sidewalls 54, the bottom palette 32, the upper palette 65, and the outer faces of the core-formers themselves. This compression of the aggregate removes substantially all of the entrained air in the aggregate and forms said aggregate into a self-supporting, pre-cast, cored block which may then be removed from the apparatus and placed in a conventional curing room where it may be cured according to standard practices.

The mold components are withdrawn from the block by actuating the cylinders to move the slides 220 into the path of movement of the guide blocks 100. The cylinders 94 are then actuated to move the beam 98 upwardly to collapse the core-formers 130, said core-formers being prevented from moving out of the mold by the slides 220 blocking the further upward movement of the guide blocks 100 on the beam 98. During the collapse of the core-formers 130, the top palette 65 is retained in position on the sidewalls 54 and thus prevents the core-formers from pulling out of the mold cavity. After the core-formers are collapsed, the top palette 65 is raised to its retracted position by the cylinders 83. With the top palette thus in its retracted position, the cylinders 232 are again actuated to move the slides 220 and 218 through their sequence of movements to permit the beam 98 to be moved upwardly to its fully retracted position in which the core-formers and end-formers are withdrawn from the mold and the block, with said beam being supported in its raised position by the slides 218. As in the case of their lowering, the beams 98 and 66 are guided as they are raised by the action of their respective gears and gear racks and the guide rods 73.

The keys 61 are removed from the bases 53 of the sidewall-forming members 52, and said members are slid outwardly in the groove 50 away from the block. The block supported on the bottom palette 32 may then be slid outwardly from the apparatus onto one of the shelves 26 for its subsequent removal to the curing room. At the time the mold components are removed from the block, the aggregate will be self-supporting and will have little or no tendency to expand to its pre-compressed state. Any expansion that does occur, however, will take place in the cores 15, and will thus not affect the outer dimensions of the block.

The time required to complete the sequence of operations just described for producing such a pre-cast cored block is in the order of thirty seconds. My apparatus thus lends itself to the large-scale production of building blocks on a commercially economic scale.

While the apparatus described is adapted to produce a block of about two feet in length and having two vertically extending cores formed therein, it is to be understood that the apparatus is adaptable for the production of longer blocks having any desired number of cores formed therein simply by increasing the length of the components forming the top, bottom, and sidewalls of the mold and by employing a larger number of expandable core-formers. Of course, where larger blocks are to be produced, the size of the aggregate buckets 168 will have to be increased to insure uniform fill of aggregate in the mold cavity.

I claim as my invention:

1. An apparatus for making cored building blocks, comprising a supporting frame having a horizontally disposed worktable mounted thereon, a mold on said worktable defining the outer faces of the blocks to be produced, said mold including a bottom palette longitudinally slidable upon said worktable into an operative position in which it is interposed between a pair of opposed sidewall-forming members, said sidewall members being slidable upon said worktable normal to said bottom palette between operative positions overlying said bottom palette and retracted positions remote therefrom, and a removable top palette supported above the bottom palette on said sidewall-forming members, said top palette and worktable having a first set of aligned openings formed therein and said bottom palette having a second set of openings formed therein and disposed in alignment with said first set of openings upon movement of said bottom palette into its operative position, a plurality of vertically movable shafts supported from the supporting frame above the mold and extending through said top palette, a plurality of end-formers and expandable core-formers slidably carried on said shafts below said top palette and adapted to form the end faces and cores of the blocks, and means for moving the shafts vertically with respect to the worktable to move said end and core-formers to and from operative position in the mold in alignment with said first and second sets of openings, said shafts being movable through the planes of the end and core-formers and said first and second sets of openings to cause the core-formers to expand to compress the aggregate in the mold.

2. An apparatus as set forth in claim 1 with the addition that said top palette is mounted on a beam vertically movable above the mold cavity by power means mounted on said supporting frame, and guide means are provided on said supporting frame and beam for guiding the vertical movements of said beam.

3. An apparatus as set forth in claim 2 in which said guide means comprises a pair of gears mounted on said beam adjacent the ends thereof and meshing with a pair of vertically extending gear racks mounted on the supporting frame.

4. An apparatus as set forth in claim 2 in which said guide means comprises a pair of slide blocks mounted on said beam adjacent the ends thereof and slidable on a pair of vertically extending guide rods mounted on the supporting frame in alignment with the longitudinal mold axis, and a pair of gears mounted on said beam adjacent the ends thereof and meshing with a pair of vertically extending gear racks mounted on the supporting frame.

5. An apparatus for making cored building blocks, comprising a supporting frame having a horizontally disposed worktable having a plurality of openings formed therein and mounted thereon, a mold on said worktable defining the outer faces of the blocks to be produced, said mold including a bottom palette having a plurality of openings formed therein slidable in a groove formed in said worktable and interposed between a pair of opposed sidewall-forming members slidable in a groove in the worktable normal to the bottom palette groove, means for releasably locking said bottom palette and sidewall-forming members in operative position on said worktable in their respective grooves with the openings in said worktable and bottom palette in alignment and said side wall-forming members overlying a pair of opposed edges of said bottom palette, and a removable top palette supported above the bottom palette on said sidewall-forming members, said top palette having a plurality of openings formed therein and disposed in alignment with said worktable openings, a plurality of vertically movable shafts supported from the supporting frame above the mold and extending through said top palette openings, a plurality of end-formers and expandable core-formers slidably carried on said shafts below said top palette and adapted to form the end faces and cores of the blocks, and means for moving the shafts vertically with respect to the worktable to move said end and core-formers to and from operative positions in the mold in alignment with the openings in said top and bottom palettes and said worktable, said shafts being movable through the planes of the openings in said bottom palette and end and core-formers and the worktable to cause the core-formers to expand to compress the aggregate in the mold.

References Cited in the file of this patent
UNITED STATES PATENTS

| | | |
|---|---|---|
| 1,127,521 | Rotarius | Feb. 9, 1915 |
| 1,637,708 | Porter | Aug. 2, 1927 |
| 1,919,807 | Sharpe | July 25, 1933 |
| 2,315,634 | McCall | Apr. 6, 1943 |
| 2,507,924 | Morse | May 16, 1950 |
| 2,542,584 | Sherman et al. | Feb. 20, 1951 |
| 2,542,874 | Locatelli | Feb. 20, 1951 |
| 2,729,871 | Locatelli | Jan. 10, 1956 |
| 2,865,208 | Wacht | Dec. 23, 1958 |
| 2,941,274 | Wise et al. | June 21, 1960 |

FOREIGN PATENTS

| | | |
|---|---|---|
| 639,986 | Great Britain | July 12, 1950 |